United States Patent
Faber

[15] 3,657,014
[45] Apr. 18, 1972

[54] POROUS ELECTRODE-SUPPORT FOR ALKALINE ACCUMULATORS

[72] Inventor: Peter Faber, Kahl, Main, Germany
[73] Assignee: Rheinisch-Westfalisches-Elektrizitatswerk, Essen, Germany
[22] Filed: Oct. 19, 1970
[21] Appl. No.: 82,089

Related U.S. Application Data

[63] Continuation of Ser. No. 834,683, June 19, 1969.

[30] Foreign Application Priority Data

June 20, 1968 Germany...................P 17 71 646.0

[52] U.S. Cl..............................................136/64, 29/182.5
[51] Int. Cl......................................................H01m 35/04
[58] Field of Search...................136/28, 29, 64, 65, 120.75, 136/121–122, 57, 74; 75/200, 201, 202, 212, 222, 206; 29/182.5

[56] References Cited

UNITED STATES PATENTS

| | | | |
|---|---|---|---|
| 747,454 | 12/1903 | Lowendahl | 75/201 |
| 2,627,531 | 2/1953 | Vogt | 136/20 |
| 2,678,343 | 5/1954 | Daniel | 136/136 |
| 3,023,262 | 2/1962 | Emmerling | 136/120 |
| 3,260,576 | 7/1966 | Gruene et al. | 29/182.5 |
| 3,282,737 | 11/1966 | Hintermann et al. | 136/120 |
| 3,297,484 | 1/1967 | Niedrach | 136/120 X |

FOREIGN PATENTS OR APPLICATIONS 827,016  1/1960  Great Britain........................29/182.5

Primary Examiner—Anthony Skapars
Attorney—Karl F. Ross

[57] ABSTRACT

A porous electrode support for alkaline accumulators consisting of a sintered mass of chemically nickel-coated graphite particles with a particle size of 5 to 200 $\mu$. A reinforcing fiber layer is sintered to the particles and can consist of synthetic resin or vitreous fibers coated with nickel. Preferably the fiber reinforcing mats or webs are provided on both faces of the flat support.

4 Claims, 3 Drawing Figures

PATENTED APR 18 1972 3,657,014

Peter Faber
*Inventor.*

By
Karl F. Ross
*Attorney*

POROUS ELECTRODE-SUPPORT FOR ALKALINE ACCUMULATORS

This application is a continuation of my copending application Ser. No. 834,683, filed June 19, 1969.

The present invention relates to a porous electrode support for alkaline accumulators and, more particularly, to a support for use in nickel-zinc, nickel-cadmium or like rechargeable electrochemical systems.

It is a common practice in connection with alkaline accumulators, i.e. rechargeable electrochemical systems, especially batteries using an alkaline electrolyte, to provide the active material of one or both of the electrodes upon a porous or electrolyte-permeable support. This support, which is electrically conductive, serves as a current-supply or current-collection network in intimate contact with the active material of the electrode. Such supports have been provided in many forms, for example as screens or grids made of metal wire, metallized fiber and the like, stamped- or punched-metal frameworks, pocketed metal plates, sintered-powder bodies in which the active material is disposed within the pores and on the surfaces of the support, and the like.

In other electrode structures, the active material is retained in a package or envelope and merely is a current-collecting or current-distribution network.

In most cases, however, the support must be capable of carrying the active material without appreciable change of shape of the electrode, must be capable of withstanding mechanical, chemical and electrical stresses arising in the electrodepack, and must be stable against any deterioration in the electrolytic medium in which the cell is operated.

Mechanical stresses, for example, may arise from swelling of the electrode pack which may have separators fitted tightly between electrodes of opposite polarity, or from the generation of gas on electrical charging or discharging of the cell. Moreover, high rates of charge and discharge of the cell give rise to the evolution of heat causing thermal stresses which tend to expand or contract the electrode and, in an unstable system, may cause sloughing of the active electrode material or other deterioration of the cell structure.

Finally, an important consideration in the choice of construction of a support for the active material in a battery or other rechargeable system, is the uniformity of the current distribution and current collection to avoid concentration of current flow at limited regions of the plate. On charge, especially when the electrode is used in conjunction with a replatable electrochemical mass, such charge concentrations or localized elevated current densities may result in localized concentrations of the active material with a variation in plate reliability, ampere-hour capacity, etc.

It has been proposed earlier to provide a support for the active material of an electrode, especially for nickel alkaline accumulators or storage cells in which nickel-plated graphite particles are sintered together, in conjunction with finely divided nickel dust. In such systems, the graphite particles have a particle size which is relatively large, i.e. well over 200 $\mu$ in particle diameter.

The graphite particles are galvanically plated with nickel, i.e. electroplated, and thereafter sintered into a plate-like body. Such systems have, however, the disadvantage that a galvanic nickel plating upon graphite particles cannot be held uniform and, when these particles are combined with nickel dust in an electrode support of the character described, they consume more nickel than is necessary.

Furthermore, in mechanical respects, electrode supports of the character described are also not satisfactory. Firstly, the support is brittle and easily broken upon subjection to mechanical stress. Secondly, the nonuniformity of the electroplating of nickel upon the graphite particles, which, as mentioned earlier, have a particle size far in excess of 200$\mu$, results in a defective sintering of the support into a coherent body. More specifically, regions at which insufficient nickel is present as a coating of the graphite particles fail to sinter at all, while regions in which excessive nickel is present sinter to a greater extend than other regions of the coating. Consequently, portions of the electrode support are mechanically unstable. Lastly, in this connection, it may be noted that a nonuniform coating of the graphite particles, which are to be rendered coherent as part of the support for the electrochemically active material of an alkaline accumulator or storage cell, gives rise to nonuniformity of current distribution on charge and discharge cycling with the disadvantages with respect to current density enumerated earlier.

While it has been proposed to coat sheet-or foil-like substrates of synthetic resins or fibers of various types with nickel in nongalvanic systems, e.g. nonelectrical plating, it has not in general been possible heretofore to provide such coatings on graphite particles of the type incorporated in electrodes as mentioned earlier. Such nonelectrical coating or so-called chemical plating of nickel makes use of a precipitation, generally in heated solution and preferably at or close to the boiling point thereof, of metallic nickel by reducing nickel ions available in the solution. In synthetic-resin coating by these methods, considerable preparation of surface to receive the nickel coating is required. Metals which are electrochemically remote from the noble metals in the electrochemical series, such as iron or copper, accept nickel directly from solution. Compact or bulk graphite, however, appears to be absolutely immune to chemical plating with nickel by any of the known processes of the general type described above. Even surface treatments, short of actually coating the graphite with other materials, fails to render the nickel acceptable by the graphite.

It is, therefore, the principal object of the present invention to provide a porous electrode support for an alkaline accumulator whereby the aforementioned disadvantages are obviated, and a mechanically stable electrode is constituted.

Another object of this invention is to provide an improved nickel support grid or porous electrode structure having better mechanical and electrical properties by comparison with earlier support structures.

Still another object of the present invention is to provide a porous-powder electrode support, especially for nickel alkaline accumulators, having high structural strength, ability to withstand repeated charge-discharge cycling, resistance to mechanical and thermal stress, and the uniformity and unalterability requisite in such systems.

I have now found, most surprisingly, in spite of the fact that compact graphite is almost completely immune to coating by chemical plating of nickel onto substrates under high-temperature processing, that it is possible to chemically plate graphite particles of a particle size of 5 to 200$\mu$ by conventional nonelectrical or electroless plating techniques at or close to the boiling point of the chemical-plating solution.

Consequently, the present invention provides, according to an essential feature thereof, that the electrode structure is composed at least in part of a sintered mass of graphite particles having a particle size of 5 to 200$\mu$, chemically plated with nickel. The nickel-coated graphite particles, which are found to have a highly uniform and continuous sheath of nickel, can be sintered together uniformly and economically with a minimum of difficulty to yield a highly stable electrode structure resistant to mechanical, thermal and other stresses arising in alkaline-accumulator systems.

According to a further feature of this invention, porous sintered nickel-coated graphite particles are provided with at least one layer of porous reinforcement in the form of a fibrous material which, moreover, is sintered to the nickel-coated particle body. While this layer may be received within the sintered-particle body, preferably it is applied at least on one surface thereof and has at least a metal surface sinterable to the particles. Still more favorable is an arrangement in which such a layer is provided on each face of the sintered-particle plate.

The reinforcement layer, according to this invention, is a mat, fleece or fabric composed of nickel-coated fibers, preferably of synthetic resin or a refractory mineral material. The nickel-coated mat, fleece or fabric is preferably composed of glass fibers, synthetic-resin monofilament (e.g. nylon) or natural fibers (e.g. of cotton) or the like.

After nickel coating of the graphite particles of the limited particle size mentioned earlier, these particles are sandwiched between two layers of the reinforcement and sintered into a coherent body at a temperature of about 900° C.

In my application Ser. No. 668,006 filed 15 Sept. 1967, (now U.S. Pat. No. 3,476,604) I have described a grid for an electrode of an electrochemical cell, e.g. a fuel cell or a unit of a primary or secondary battery. Such grids serve the dual purpose of supporting the active electrode material and providing a low-resistance current path between the particles of such material. In that system, a web of carbonized and at least superficially graphitized filaments constitutes a coherent skeleton on which a metallic coating is deposited to confer the necessary rigidity and conductivity to the web. The metallic coating is preferably deposited by so-called electroless chemical plating whereby the metal is precipitated from a solution of a compound in which the metal is the cation with the aid of a reducing agent. In the system of that application, the coating consisted predominantly of nickel and a small amount (about 5 percent by weight) of boron and was deposited, for example, from an aqueous solution of a nickel salt (e.g. nickel chloride or nickel nitrate) in the presence of a reducing boron compound e.g. a borohydride such as lithium borohydride). The nickel coating of that system was applied to a thickness of 5 to 10µ.

In my application Ser. No. 504,263, filed 23 Oct. 1965, now U.S. Pat. No. 3,436,267, and copending with the first-mentioned application, I have described a method of making nickel compounds which may be applied to such electrode grids for use in alkaline accumulators. Basically, the system makes use of a treatment of dry, divalent nickel hydroxide with an ozone-containing gas at a temperature between substantially 20° C. and 110° C. for a period sufficient to convert substantially all of the nickel hydroxide into a black mass of a higher oxidation state with an apparent formula of NiOOH. The divalent nickel hydroxide is agitated in the gas stream containing ozone and the latter may be formed in an oxygen gas by ultraviolet irradiation. The treatment may be carried out in a gas vortex. This resultant compound may be used as the active material of an electrode plate having the support described above in accordance with the present invention. The fibers applied as reinforcements on either side of the sintered-particle mass may be those described in application Ser. No. 668,006 or Ser. 624,646 filed 1 Mar. 1967. In the latter application, I have described arrangements wherein the fibers are electrochemically coated in accordance with the principles of U.S. Pat. No. 3,185,591 or U.S. Pat. No. 3,006,821.

The above and other objects, features and advantages of the present invention will become more readily apparent from the following description, reference being made to the accompanying drawing in which.

Figure 1:
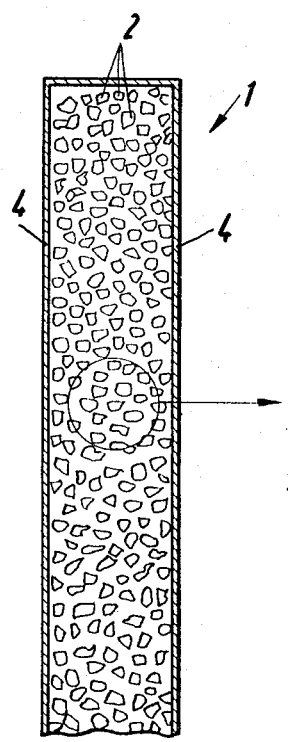
FIG. 1 is a diagrammatic cross-section through an electrode support according to the present invention.
Figure 2:
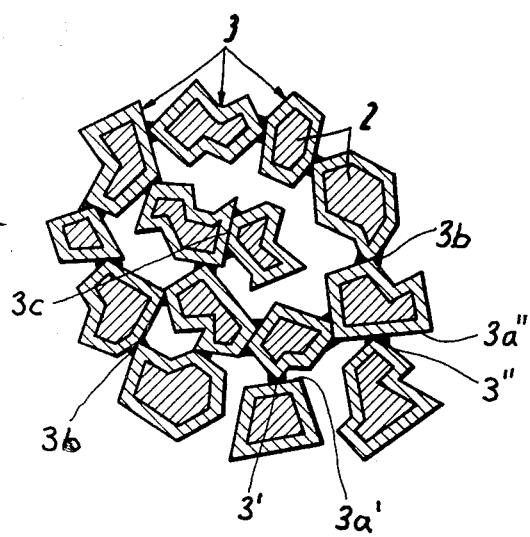
FIG. 2 is an enlarged detail view of a portion of the electrode-support structure of FIG. 1.
Figure 3:
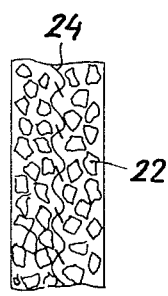
FIG. 3 is a diagrammatic view of yet another electrode structure.

In FIGS. 1 and 2 of the drawing, I have shown an electrode-support structure 1 for an alkaline accumulator which comprises, basically, a relatively thick flat body or plate composed of graphite particles, chemically plated with nickel, sintered together at a temperature of about 900° C. As can be seen from FIG. 2, the graphite particles 2, which have a particle size of about 20µ but may range in particle size between 5 and 200µ according to the principles of this invention, are coated uniformly with a chemically deposited nickel layer 3 and are sintered at contact points between these coatings into a body with high mechanical strength and resistance to the stresses arising in a electrode system. The sintered-powder body is sandwiched between a pair of nickel-coated fiber mats, which may be of a nonwoven type, and/or fabric webs represented at 4, these reinforcements being provided on both outer sides of the powder mass. In FIG. 3 the reinforcement is shown to be a fabric web 24 received within the mass 22. The nickel coatings of the fiber are sintered to the particles.

While any of the chemical-plating or electroless processes for the metal coating of graphite particles may be used, I have noted in application Ser. No. 668,006 that there is an advantage in including a small amount of boron in the nickel coating. The electroless process which is used according to the present invention to coat particles of graphite having a particle size 5 to 200µ, but which is not capable of effectively coating bulk graphite, may be that described in U.S. Pat. No. 3,338,726.

As shown in FIG. 2, the particles 2 are not substantially rounded and may have angular edges and generally flat faces which, nevertheless, are uniformly coated with the constant thickness of the nickel plate. This angular-edged configuration of the graphite particles, which may be obtained by milling, crushing or otherwise comminuting graphite, provides the advantage that a interparticle contact within the mass is effected between angular junctions and flat surfaces. For example, in FIG. 2 angular edges at 3' and 3'' are joined to flat surfaces at 3a' and 3a''. At other junctions, e.g. at the junction 3b, angular edges of two particles are joined. With lesser frequency, flat surfaces of the particles may be sintered together as shown at 3c.

EXAMPLE

Using the bath and conditions set forth in U.S. Pat. No. 3,338,726, a mass of graphite particles with a particle size of about 20 µ is chemically plated with nickel to a uniform coating thickness of about 5µ. The mass is rinsed, pressed into sheets, sandwiched between nickel-coated glass-fiber mats and sintered at a temperature of about 900° C. The resulting plates may then be cut up for use in an electrochemical cell and may receive a coating of the active material of U.S. Pat. No. 3,436,267.

I claim:

1. A porous-powder electrode support for alkaline accumulators, comprising a porous body of coherent graphite powder particles in a size ranging between substantially 5 and 200 µ, said particles being each completely ensheathed by a continuous nickel coating of substantially uniform thickness and being in sintered coating-to-coating contact with one another, and a reinforcement for said body comprising nickel-coated filamentary fibers in sintered coating-to-coating contact with one another and with said particles.

2. An electrode support as defined in claim 1 wherein said fibers consist of synthetic-resin monofilaments.

3. An electrode support as defined in claim 1 wherein said fibers consist of glass.

4. An electrode support as defined in claim 1 wherein said body is flat and said fibers form a layer on at least one major surface thereof.

* * * * *